US009626186B2

(12) United States Patent
Cavanna et al.

(10) Patent No.: US 9,626,186 B2
(45) Date of Patent: *Apr. 18, 2017

(54) HYBRID POLYMOPRHIC INLINE CACHE AND BRANCH TARGET BUFFER PREDICTION UNITS FOR INDIRECT BRANCH PREDICTION FOR EMULATION ENVIRONMENTS (71) Applicant: International Business Machines Corporation, Armonk, NY (US)

(72) Inventors: Carlos Cavanna, Toronto (CA); Reid Copeland, Richmond Hill (CA); Chad McIntyre, Richmond Hill (CA); Ali Sheikh, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,586

(22) Filed: Mar. 8, 2016

(65) Prior Publication Data
US 2016/0188338 A1 Jun. 30, 2016

Related U.S. Application Data (60) Continuation of application No. 14/068,044, filed on Oct. 31, 2013, now Pat. No. 9,317,292, which is a
(Continued)

(51) Int. Cl.
*G06F 9/38* (2006.01)
*G06F 9/30* (2006.01)
(Continued)

(52) U.S. Cl.
CPC ........ *G06F 9/30058* (2013.01); *G06F 9/3806* (2013.01); *G06F 9/3848* (2013.01);
(Continued)

(58) Field of Classification Search
CPC ..................................................... G06F 9/3848
See application file for complete search history.

(56) References Cited

U.S. PATENT DOCUMENTS 5,584,001 A 12/1996 Hoyt et al.
5,794,063 A 8/1998 Favor
(Continued)

OTHER PUBLICATIONS

Non Final Office Action dated Feb. 20, 2015, received for U.S. Appl. No. 14/068,033.
(Continued)

*Primary Examiner* — Jacob A Petranek
(74) *Attorney, Agent, or Firm* — Fleit Gibbons Gutman Bongini Bianco PL; Thomas S. Grzesik (57) ABSTRACT Branch instructions are managed in an emulation environment that is executing a program. A plurality of slots in a Polymorphic Inline Cache is populated. A plurality of entries is populated in a branch target buffer residing within an emulated environment in which the program is executing. When an indirect branch instruction associated with the program is encountered, a target address associated with the instruction is identified from the indirect branch instruction. At least one address in each of the slots of the Polymorphic Inline Cache is compared to the target address associated with the indirect branch instruction. If none of the addresses in the slots of the Polymorphic Inline Cache matches the target address associated with the indirect branch instruction, the branch target buffer is searched to identify one of the entries in the branch target buffer that is associated with the target address of the indirect branch instruction.

14 Claims, 5 Drawing Sheets

Related U.S. Application Data division of application No. 12/614,085, filed on Nov. 6, 2009, now Pat. No. 8,612,731.

(51) Int. Cl.
 *G06F 9/455* (2006.01)
 *G06F 12/0875* (2016.01)

(52) U.S. Cl.
 CPC .......... *G06F 9/455* (2013.01); *G06F 12/0875* (2013.01); *G06F 2212/452* (2013.01)

(56) References Cited

U.S. PATENT DOCUMENTS

| | | | |
|---|---|---|---|
| 5,978,909 A | 11/1999 | Lempel | |
| 6,044,459 A | 3/2000 | Bae et al. | |
| 6,453,278 B1 | 9/2002 | Favor et al. | 703/27 |
| 6,601,161 B2 | 7/2003 | Rappoport | G06F 9/3848 712/238 |
| 6,721,877 B1 | 4/2004 | Chen | G06F 9/3806 712/239 |
| 7,111,096 B1 | 9/2006 | Banning et al. | 710/100 |
| 7,523,298 B2 | 4/2009 | Gschwind | 712/239 |
| 2002/0144060 A1 | 10/2002 | Stoodley | G06F 9/4431 711/118 |
| 2003/0046449 A1 | 3/2003 | Gray-Donald | G06F 9/45504 719/330 |
| 2004/0040029 A1 | 2/2004 | Debbabi | G06F 9/443 719/315 |
| 2004/0172524 A1 | 9/2004 | Hoogerbrugge | 712/239 |
| 2006/0242393 A1 | 10/2006 | Park | G06F 9/30061 712/240 |
| 2008/0040592 A1 | 2/2008 | Vasekin et al. | 712/238 |
| 2008/0307210 A1 | 12/2008 | Levitan | G06F 9/30181 712/240 |
| 2009/0172371 A1 | 7/2009 | Joao et al. | 712/240 |
| 2011/0078425 A1 | 3/2011 | Shah | G06F 9/3806 712/239 |

OTHER PUBLICATIONS

Hiser, J., et al., "Evaluating Indirect Branch Handling Mechanisms in Software Dynamic Translation Systems", CGO '07 Proceedings of the International Symposium on Code Generation and Optimization, Mar. 2007, pp. 61-73, Washington, DC, USA.

Tao Li, Ravi Bhargava, Lizy Kurian John. "Rehashable BTB: An Adaptive Branch Target Buffer to Improve the Target Predictability of Java Code" The International Conference on High Performance Computing (HIPC) 2002.

```
     // rA contains the target_address
     // rB points to the data area on Label L0102
     ld    rC, [rB,0]
  5  cmpld rA, rC
     beq   Label L0100_2    // Branch if there is a match on slot 3
     ld    rC, [rB,8]
     cmpld rA, rC
     beq Label 10100_1      // 1 Branch if there is a match on slot 2
 10  ld    rC, [rB, 16]
     cmpld rA, rC
     bne Label L0101        // If not match on slot 1, branch to the BTB Label L0100_0:
 15  b     0x.......         // Patchable slot 1 with branch instruction to compiled code
     Label L0100_1:
     b     0xA0004800        // Patchable slot 2 with branch instruction to compiled code
     Label L0100_2:
     b     0x.......         // Patchable slot 3 with branch instruction to compiled code
 20  Label L0101:            // Instead of calling genericExitFunction, the BTB is executed // rA still contains the target_address
     rlwinm rB, rA, shift, mask    // Hash the key
     add rC, rCPU, offset of(BTB)  // Load BTB Address from CPU structure
 25  add  rD, rC, rB               // Calculate key address
     ld   rE, [rD]                 // Load key from BTB
     cmpld rA, rE                  // Check if keys match
     bne   missLabel               // if not match
     ld rF, [rD,offset]            // address from BTB – offset of compiled_branch_target_location
 30  mtspr rCTR, rF
     b rCTR                        // Branch to address
     missLabel:
     b genericExitFunction         // If the BTB misses, then it calls genericExitFunction
     Label L0102:
 35  .long 0x.............         // Patchable slot 3 with branch target address
     .long 0x0000000080006800      // Patchable slot 2 with branch target address
     .long 0x.............         // Patchable slot 1 with branch target address
```

HYBRID POLYMOPRHIC INLINE CACHE AND BRANCH TARGET BUFFER PREDICTION UNITS FOR INDIRECT BRANCH PREDICTION FOR EMULATION ENVIRONMENTS

FIELD OF THE INVENTION

The present invention generally relates to the field of information processing systems, and more particularly relates to instruction branch prediction.

BACKGROUND OF THE INVENTION

An emulator is software that creates a virtual environment where a particular type of computing system can be operated. For example, the Java Virtual Machine creates an environment where programs written in the Java programming language can run. Other types of emulators virtualize an entire computing architecture. For example, there are emulators that emulate the Intel IA32 architecture (e.g., VMWare).

Typically, emulators work by interpreting some form of instructions relevant to the target environment, and a dynamic translator (JIT, or Just-In-Time Compiler) translates such instructions into a sequence of instructions in the native instruction set of the computing system on which the emulator is running. The instruction stream that the emulator interprets is a computer program. As with any computer program, the instruction stream contains many different types of instructions, including branches to other instructions. Branches are special in that they can change the sequential flow of execution of the program and direct it to a different instruction stream.

Indirect branches contain the target address in a register, while in direct branches the target is encoded in the instruction itself. In an indirect branch instruction, the target address cannot be ascertained until the instruction is decoded and its parameters are read. Furthermore, the target address of an indirect branch instruction can change between different executions of the instruction. As a consequence, predicting the path to be taken by such indirect branch instructions can be costly.

The use of JIT compilers adds more complexity to this problem. Whenever the emulator or the compiled code encounters an indirect branch instruction, it is necessary to search whether the target address has been compiled or not (if the target has been compiled, then the memory address of the compiled instruction needs to be retrieved as well). This process creates the extra cost of the search every time an indirect branch instruction is executed. Because an indirect branch potentially has a different target address every time it is executed, the target address cannot be directly embedded in the compiled code.

SUMMARY OF THE INVENTION

In one embodiment, a method for managing branch instructions in an emulation environment that is executing a program is disclosed. The method comprises the steps of populating a plurality of entries in a branch target buffer that resides within an emulated environment in which the program is executing. Each of the entries comprises an instruction address and a target address of a branch instruction of the program. When an indirect branch instruction of the program is encountered, a processor analyzes one of the entries in the branch target buffer to determine if the instruction address of the one entry is associated with a target address of the indirect branch instruction. If the instruction address of the one entry is associated with the target address of the indirect branch instruction a branch is performed to the target address of the one entry.

In another embodiment, a method for managing branch instructions in an emulation environment that is executing a program is disclosed. The method comprises the steps of populating a plurality of slots in a Polymorphic Inline Cache. Each of the slots comprises a target address of a branch instruction of the program and a memory address of a compiled instruction representing the branch instruction. A plurality of entries is populated in a branch target buffer residing within an emulated environment in which the program is executing. Each of the entries comprises an instruction address and a target address of a branch instruction of the program. When an indirect branch instruction associated with the program is encountered, a target address associated with the indirect branch instruction is identified from the indirect branch instruction. A processor compares at least one address in each of the slots of the Polymorphic Inline Cache to the target address associated with the indirect branch instruction. If none of the addresses in the slots of the Polymorphic Inline Cache matches the target address associated with the indirect branch instruction, the branch target buffer is searched to identify one of the entries in the branch target buffer that is associated with the target address of the indirect branch instruction.

In yet another embodiment, an information processing system for managing branch instructions in an emulation environment that is executing a program is disclosed. The information processing system comprises a processor and a memory communicatively coupled to the processor. An emulator is communicatively coupled to the processor and the memory. The processor populates a plurality of entries in a branch target buffer that resides within the emulator in which the program is executing. Each of the entries comprises an instruction address and a target address of a branch instruction of the program. When an indirect branch instruction of the program is encountered, the processor analyzes one of the entries in the branch target buffer to determine if the instruction address of the one entry is associated with a target address of the indirect branch instruction. If the instruction address of the one entry is associated with the target address of the indirect branch instruction a branch is performed to the target address of the one entry.

DETAILED DESCRIPTION

Various embodiments of the present invention will be discussed in detail hereinbelow with reference to the attached drawings.

Figure 1:
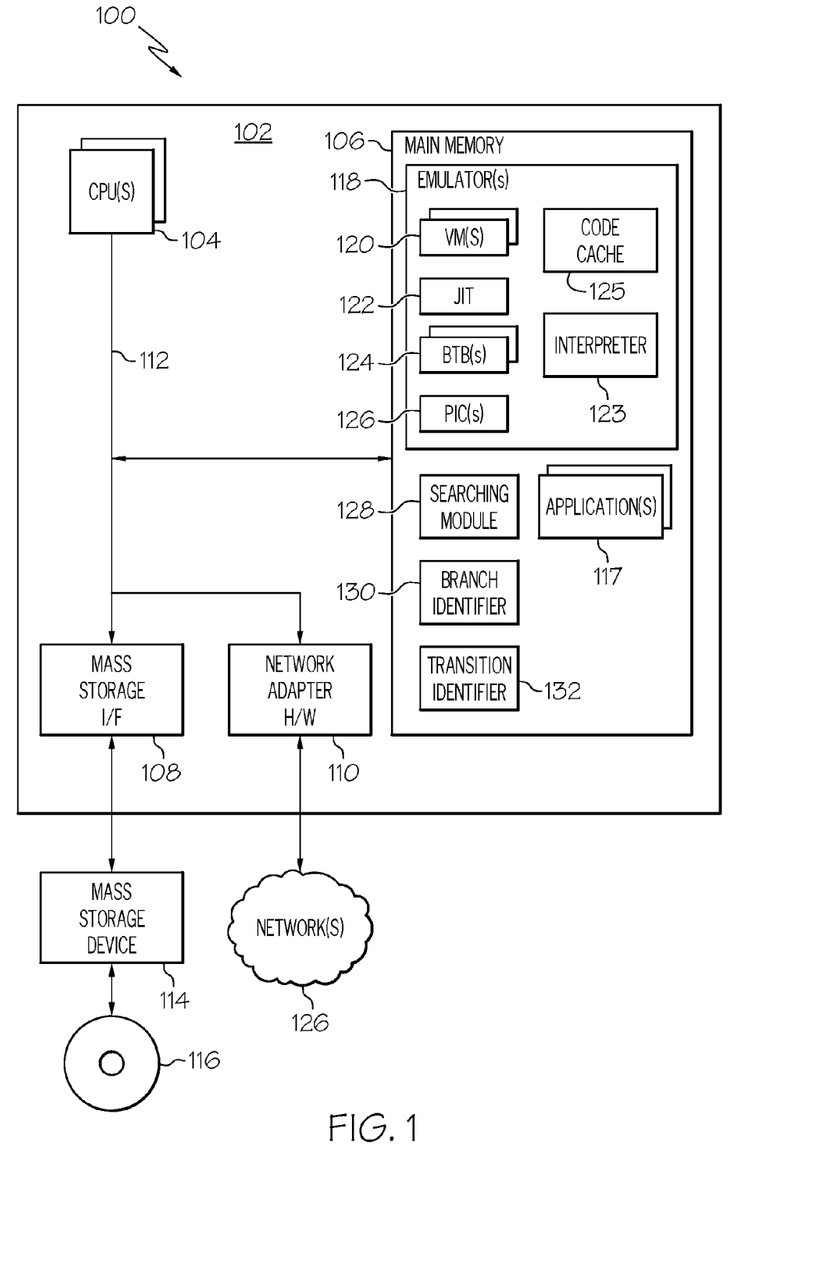
FIG. 1 is a block diagram illustrating an information processing system according to one embodiment of the present invention.

FIG. 1 is a block diagram illustrating a general view of an information processing system 100 that implements one embodiment of the present invention. The information processing system 100 is a suitably configured processing system adapted to implement one embodiment of the present invention. Any suitably configured processing system is able to be used, such as a personal computer, workstation, or the like. The information process system 100 can reside within a single system environment or in a distributed processing environment.

This exemplary information processing system 100 includes a computer 102. The computer 102 has one or more processors 104 that are connected to a main memory 106, a mass storage interface 108, and network adapter hardware 110. A system bus 112 interconnects these system components. The mass storage interface 108 is used to connect mass storage devices, such as data storage device (or mass storage device) 114, to the computer 102. One specific type of data storage device (or mass storage device) is a disk drive that can store data to and read data from a computer readable medium, such as an optical disk 116 or a magnetic disk.

The main memory 106 can be volatile and/or non-volatile memory, and includes one or more applications 117 and an emulator 118. The emulator creates a virtual environment 120 or virtual machine where a given type of computing system can be executed. The emulator 118 of this embodiment includes a Just-In-Time compiler 122 that translates the instructions that are being interpreted by the emulator 118 into a sequence of instructions in the native instruction set of the information processing system 100. The emulator 118 also includes one or more interpreters 123, code caches 125, Branch Target Buffers (BTBs) 124, Polymorphic Inline Caches (PICs) 126, searching modules 128, branch identifiers 130, and transition identifiers 132. The BTB 124 residing within the emulator dynamically predicts the path of a branch instruction encountered by the emulator 118 and/or the JIT 122 based on its execution history. This reduces the performance penalty of branches in pipelined processors.

Although illustrated as concurrently resident in the main memory 106, such components are not required to be completely resident in the main memory 106 at all times or even at the same time. In this embodiment, the information processing system 100 utilizes conventional virtual addressing mechanisms to allow programs to behave as if they have access to a large, single storage entity (referred to as "computer system memory"), instead of access to multiple, smaller individual storage entities such as the main memory 106 and data storage device 116. The term "computer system memory" generically refers to the entire virtual memory of the information processing system 100.

Although only one CPU 104 is illustrated for computer 102, computer systems with multiple CPUs can be used equally effectively. This embodiment of the present invention further incorporates interfaces that each includes separate, fully programmed microprocessors that are used to off-load processing from the CPU 104.

An operating system is included in the main memory, and is preferably a suitable multitasking operating system. However, further embodiments of the present invention use any other suitable operating system. Some embodiments of the present invention utilize an architecture, such as an object oriented framework mechanism, that allows instructions of the components of the operating system to be executed on any processor located within the information processing system 100. The network adapter hardware 110 is used to provide an interface to a network 126. Embodiments of the present invention are able to be adapted to work with any data communications connections including present day analog and/or digital techniques, or a future networking mechanism.

Although this exemplary embodiment of the present invention is described in the context of a fully functional computer system, further embodiments are capable of being distributed as a program product via a tangible computer readable storage medium (such as a CD, DVD, diskette, flash memory device, or other form of recordable media), or via any type of electronic transmission mechanism.

The following is a more detailed discussion of the BTB 124 implemented within the emulator 118. As explained above, the program interpreted by the emulator includes branches such as indirect branches. Indirect branches can be costly because the target address of an indirect branch instruction cannot be ascertained until the instruction is decoded and its parameters are read.

In an emulation environment with a JIT compiler, a Polymorphic Inline Cache (PIC) can be used to overcome this problem. However, using a PIC by itself has at least two drawbacks: the slots can only be populated once, and there are a limited number of slots that can be introduced into the code without causing serious code bloat. If these slots can only be populated once (and not modified), then the system could fall into scenarios where the values cached are not the most common targets, and the compiled code is left with outdated, and therefore inefficient, cached information.

Therefore, the BTB 124 is implemented within the emulator 118. The BTB 124 can be used in conjunction with a target-search operation by the emulator 118 and/or the JIT compiler 122 for a branch instruction in the emulation environment, so as to improve the dispatch time of indirect branches. Whenever the emulator 118 needs to resolve the target of an indirect branch instruction (i.e., while interpreting instructions or executing compiled instructions), the emulator 118 uses the BTB 124 to decrease the search time.

The use of the BTB 124 with the JIT compiler 122 has the advantage that the BTB 124 can dynamically change its contents based on the execution nature of the program. A piece of generic code, in one embodiment, is introduced in the compiled code to search within the BTB 124 for a match with the target address of the branch instruction. If found, the compiled code can branch directly to the address of the compiled instruction.

In addition, by dynamically changing its contents based on the execution nature of the program, the BTB 124 is resizable, either statically by recompiling the program or dynamically based on the program requirements at runtime. The hashing techniques used to search the BTB 124 can be easily modified statically or dynamically based on the project needs. Another advantage of the BTB 124 is that a separate BTB 124 structure can be implemented for each emulated CPU. The BTB structures 124 do not require locking, which prevents contention, and allows for each CPU to have independent information on common paths of execution. Also, multiple associability (n-way) can be used on the BTB. In other words, for every key within the BTB 124, more than one target address can be associated with the BTB 124. Therefore, the BTB 124 is not limited to only one entry.

In this exemplary embodiment, the BTB 124 is a structure that includes information on a branch instruction target address, which is the memory address where an indirect branch instruction branches to, and a target address, which is the memory address in the emulated program where the code may intend to continue its operation. The branch instruction target address can be used as the search key inside the BTB structure 124. This search key is matched by a target-search operation of the emulator 118 and/or JIT 122 with the most likely target address(es) of the given branch.

Figure 2:
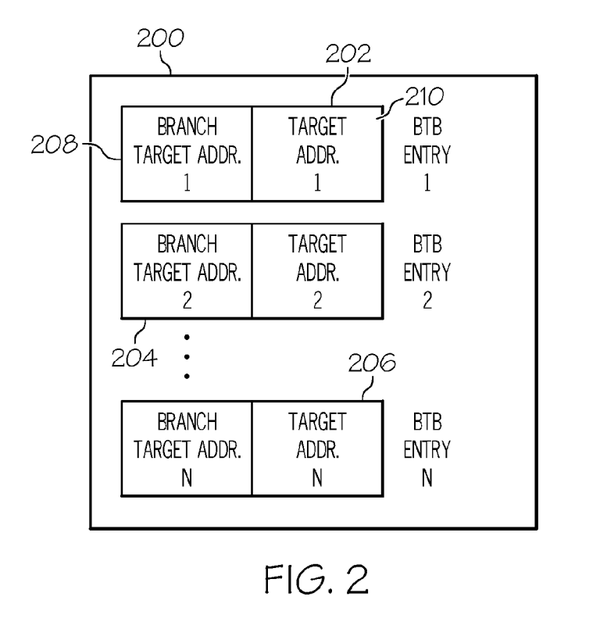
FIG. 2 shows a Branch Target Buffer according to one embodiment of the present invention.

FIG. 2 shows a BTB according to one embodiment of the present invention. The BTB 124 is part of an emulated environment 200 (e.g., an emulated CPU) and has multiple BTB entries 202, 204, and 206. Each entry is a data structure comprising a key 208 (i.e., branch instruction target address) and a branch target location 210. The collection of BTB entries 202, 204, and 206 allows the emulated environment structure 200 to hold information for several addresses. As discussed further below, these entries are populated when the target of a branch is not found in the BTB and needs to be resolved.

In this exemplary embodiment, the entry 202 for the BTB 124 is defined as follows.

```
struct trace_btb_entry
{
    keyType      _key;
    uint8_t      *_branch_target_location;
};
``` where _key stores the branch instruction target address, and _branch_target_location stores the branch target location. Also in this embodiment, the emulated environment structure 200 is defined as follows.

```
typedef struct cpu
{
...
    struct trace_btb_entry   trace_btb[BUFFER_SIZE];
...
}
``` where trace_btb stores the BTB entries.

When a branch instruction is encountered within the program, the branch identifier 130 identifies this branch within the program. This triggers the searching module 128 to perform a search within the BTB 124. In this embodiment, a hashing operation is performed to search the BTB 124. For example, the collection of BTB entries 202, 204, and 206 can be used as a hash table in which the instruction address 208 is the hash key. If the branch instruction target address 208 of one of the BTB entries 202, 204, or 206 matches the target address of the current branch instruction, then the program branches to the target address location 210 within the given entry. If none of the entries include matching instruction addresses 208 (i.e., a miss occurs), then the searching module 128 informs the emulator 118 and the program operation performs conventional processing techniques to determine the address to which the program should branch. Once the conventional processing techniques are performed, the target instruction address of the given branch instruction and the address to which it branched are stored in a new entry within the BTB 124.

In this exemplary embodiment, this searching process is implemented through the following code.

```
uint8_t* search_BTB_branch_target    (keyType key)
{
    int btb_index = HASH_BTB(key);
    if (trace_btb[btb_index]._key == key)
    {
        return trace_btb[btb_index]._branch_target_location;
    }
    return NULL
}
```

As can be seen, a hashing operation is performed on the entry key 208. If the instruction address 208 of one of the BTB entries 202, 204, or 206 matches the target address of the current branch instruction, then the program branches to the target address location 210 within the given entry.

Figure 3:
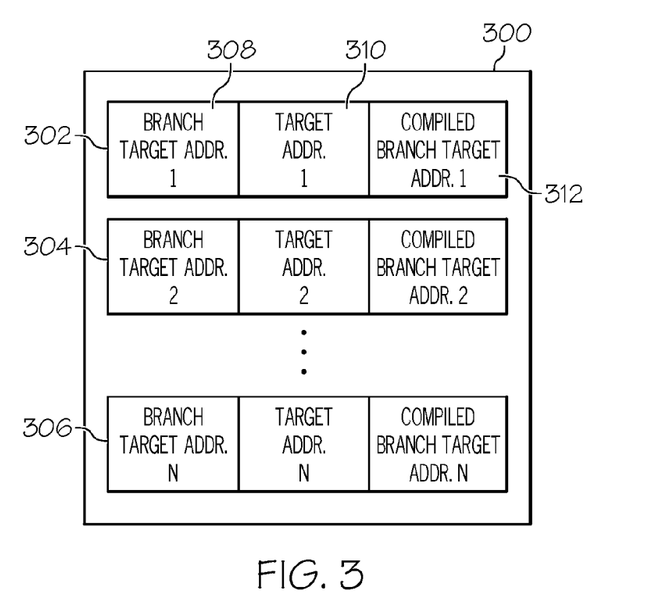
FIG. 3 shows a Branch Target Buffer according to another embodiment of the present invention.

The above implementation of the BTB 124 within the emulator 118 is also beneficial when applied to the JIT compiler 122. For example, when the emulator 118 uses the JIT compiler 122 there is a constant transition between non-compiled instructions and compiled sequences. This requires a search to be made at a transition point to find the location of the subsequent instruction to perform when the instruction is an indirect branch. In another embodiment, the BTB 124 includes additional information such as the target location of a compiled trace. FIG. 3 shows a Branch Target Buffer according to this other embodiment of the present invention. The emulated environment 300 (e.g., an emulated CPU) of this embodiment also includes multiple BTB entries 302, 304, and 306 for the BTB 124. Each entry is a data structure comprising a key 308 (i.e., branch instruction target address), a branch target location 310, and a compiled branch target location 312.

In this embodiment, a transition identifier 132 within the emulator 118 determines when a code transition is encountered. When the transition identifier 132 determines that a code transition has been encountered, the searching module 128 is initialized. The searching module 128 searches the BTB 124 to determine if, for the branch instruction target address, a compiled trace already exists.

For example, in one embodiment, a hashing operation is performed to search the BTB 124. The collection of entries 302, 304, and 306 is used as a hash table similar to the above embodiment. If the branch instruction target address 308 of one of the entries 302, 304, or 306 matches the target address of the branch instruction, then the target branch for this branch instruction is identified as the address in the compiled branch target location 312. In other words, a compile trace already exists. If there were no hits in the BTB 124 (i.e., the searching module 128 failed to find a matching key), a regular search can be performed and the contents stored in the BTB 124. Thus, when the address is requested a subsequent time, a search in the BTB 124 will result in a hit.

In this exemplary embodiment, this searching process is implemented through the following code.

```
uint8_t* is_compiled(keyType key)
{
    int btb_index = HASH_BTB(key);
    if (trace_btb[btb_index]._key == key)
    {
```

```
        return
            trace_btb[btb_index]._compiled_branch_target_location;
        }
    recordType *record = record_structure[key];
    for(;record; record = record->next)    // Need to walk the list
        if(record->key == key)
        {
            trace_btb[btb_index]._compiled_branch_target_location =
    record->compiled_branch_target_location;
            trace_btb[btb_index]._branch_target_location = record-
    >branch_target_location;
            trace_btb[btb_index]._key = key;
            return
    trace_btb[btb_index]._compiled_branch_target_location;
        }
    return NOT_FOUND;
}
```

As can be seen, the searching module 128 analyzes the hashed entry 302 in the BTB 124. If the key 308 does not match the branch target address entry, then the searching module 128 analyzes the full list of compiled sequences, and so on. When there is a hit, the compiled branch target location is identified as the location in the program to which the next instruction needs to branch, and the BTB is populated accordingly.

In another embodiment, the BTB 124 and the searching process described above are also applied to code compiled by the JIT compiler 122. In particular, when compiled code wants to branch to another compiled sequence, the JIT 122 performs an efficient search into the BTB structure 124 from within the code compiled by the JIT compiler 122. This way, the JIT compiler 122 can determine if the target address for an indirect branch instruction is compiled and whether the branch can jump directly to the target address. This embodiment is particularly useful when the code has many transitions between separately compiled traces.

For example, on the Power Architecture, this can be implemented as follows.

```
    rlwinm   rB, rA, shift, mask
    addi     rC, rCPU, offsetof(BTB)
    add      rD, rC, rB
    ld       rE, [rD]
    cmpld    rA, rE
    bne      missLabel
    ld       rF, [rD,offset]
    mtsp     rCTR, rF
    b        rCTR
misslabel:
    b        genericExitFunction
    ...
```

In this example, register rA comprises the branch target address, and the searching module 128 hashes the key. That is, the searching module 128 hashes the value in rA and stores this value in register rB. The searching module 128 then loads the address of the BTB 124 from the emulated environment structure 300 and stores this value in register rC. The key address is calculated from the values in registers rB and rC. The key address is then stored in register rD. The key is then loaded from the BTB 124 and stored in register rE. The searching module 128 compares the branch target address in register rA with the key from the BTB 124 in register rE. If the keys do not match then the operation exits and conventional processing takes place. In another embodiment, if the keys do not match, then the next entry is analyzed, or if there are no more entries in the BTB 124 then the operation exits and conventional processing takes place. If the keys do match, then the compiled branch target address 312 in the entry is loaded into register rF and the instruction branches to this address.

The BTB 124 of the present invention can also be used in conjunction with a Polymorphic Inline Cache (PIC) 126. A PIC 126 is used in the emulation environment with the JIT compiler 122. The PIC 126 introduces a fixed number of data slots to the compiled code where two pieces of information are stored: the target address of the branch instruction and the memory address of the compiled instruction that represents it. At run-time, these slots are populated based on the branch targets encountered during program execution. For example, if the emulated branch instruction goes to address 0x80006800 and the corresponding compiled code resides on memory address 0xA0004800, then the data slots are populated with these two values. Code that reads these slots and compares the target address with the values cached is also introduced into the compiled code. If the values match, then the code can branch directly to the memory address of the compiled instruction.

For example, in one embodiment this is implemented as follows.

```
ld                       rC, [rB, 0]
cmpld                    rA, rC
beq                      Label L0100_2
ld                       rC, [rB, 8]
cmpld                    rA, rC
beq                      Label L0100_1
ld                       rC, [rB, 16]
cmpld                    rA, rC
bne                      Label L0101
genericExitFunction
Label                    L0100_0:
b                        0x....... // Patchable slot 1 with
                                   branch instruction to
                                   // compiled code
Label                    L0100_1:
b                        0xA0004800 // Patchable slot 2 with
                                   branch
                                   // instruction to compiled code
Label                    L0100_2:
b                        0x....... // Patchable slot 3 with branch
                                   // instruction to compiled code
Label                    L0101:
bl     genericExitFunction
Label                    L0102:
.long 0x......    // Patchable slot 3 with branch target address
.long 0x0000000080006800   // Patchable slot 2 with branch
                           // target address
.long 0x.................  // Patchable slot 1 with branch target address
```

In this example, register rA comprises the target address and register rB points to the data area on Label L0102. Each slot is read and the branch target address is compared with the cached values. If the values match, then the code can branch directly to the memory address of the compiled instruction. If the values do not match, then the next slot is read, and so on.

However, as discussed above, using a PIC by itself has various drawbacks. Therefore, in one embodiment of the present invention, the PIC is combined with a BTB. In this hybrid PIC/BTB embodiment, the searching module 128 first searches the PIC 126 and if all of the slots result in a miss, the searching module 128 initiates the search process for the BTB 124 as discussed above (as compared to the searching module 128 performing conventional processing after all the slots yield a miss).

Figure 4:
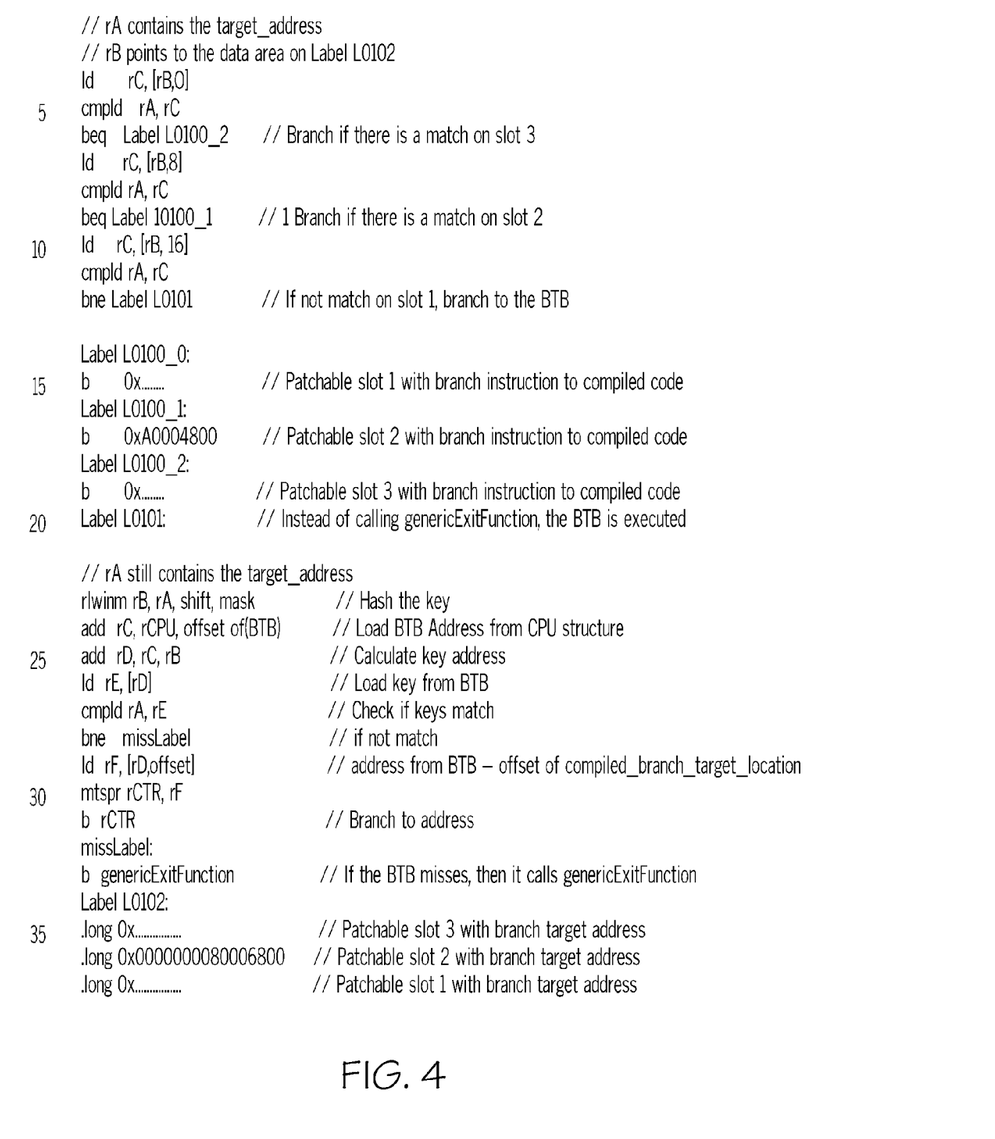
FIG. 4 shows code for performing a hybrid Polymorphic Inline Cache-Branch Target Buffer search according to one embodiment of the present invention.

FIG. 4 shows code for performing a hybrid Polymorphic Inline Cache-Branch Target Buffer search according to one embodiment of the present invention. In this exemplary embodiment that combines the PIC 216 with the BTB 124, register rA comprises the branch target address and register rB points to the data area on Label L0102. The searching module 128 searches each slot of the PIC 126 and the target address is compared with the cached values. If a slot yields a hit, then the code can branch directly to the memory address of the compiled instruction. If none of the slots yields a hit, then instead of performing conventional process the searching module 128 performs a search on the BTB 124.

At this point, register rA still comprises the branch target address. The searching module 128 hashes the value in rA and stores this value in register rB. Searching module 128 then loads the address of the BTB 124 from the emulated environment structure 300 and stores this value in register rC. The key address is calculated from the values in registers rB and rC. The key address is then stored in register rD. The key is then loaded from the BTB 124 and stored in register rE. The searching module 128 compares the branch target address in register rA with the key from the BTB 124 in register rE. If the keys do not match, then the operation exits and conventional processing takes place. In another embodiment, if the keys do not match then the next entry is analyzed, or if there are no more entries in the BTB 124 then the operation exits and conventional processing takes place. If the keys do match, then the compile branch target address 312 in the entry is loaded into register rF and the instruction branches to this address.

Figure 5:
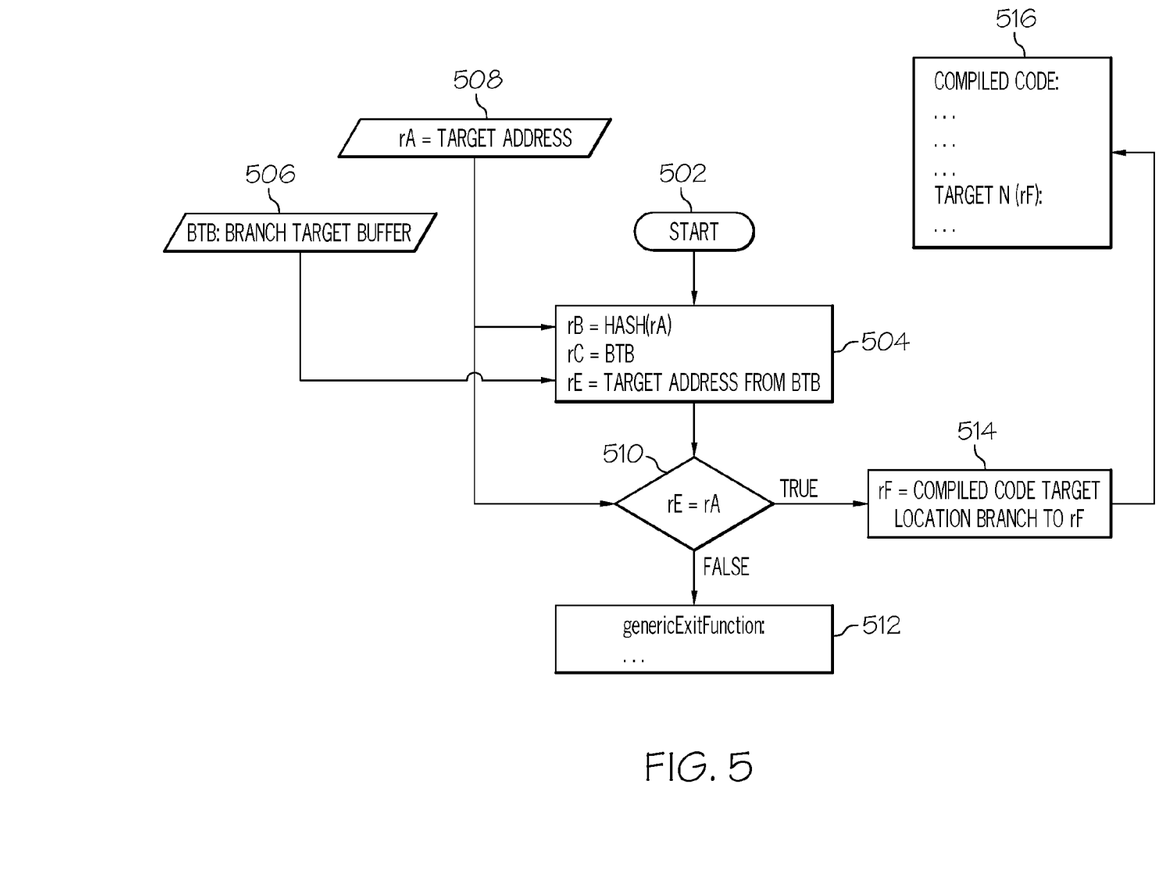
FIG. 5 is an operational flow diagram illustrating a process for managing indirect branch instructions using a Branch Target Buffer within an emulator according to one embodiment of the present invention.

FIG. 5 is an operational flow diagram illustrating a process for managing indirect branches using a BTB within an emulator according to one embodiment of the present invention. The operational flow diagram begins at step 502. The indirect branch identifier determines that an indirect branch has been encountered. The searching module, at step 504, receives the BTB information 506 and a branch target address 508 from register rA as inputs. The searching module then performs a hashing function to obtain a key/index for performing a search on the BTB to identify the target address of the indirect branch.

For example, the searching module performs a hash on a key associated with the target of the indirect branch instruction. In other words, the searching module performs a hash on the value in register rA and stores this value in register rB. The searching module then loads the address of the BTB from the emulated environment structure and stores this value in register rC. The key address is calculated from the values in registers rB and rC. The key address is then stored in register rD (See FIG. 4). The key is then loaded from the BTB and stored in register rE. The searching module, at step 510, compares the target address in register rA with the key from the BTB in register rE. If the keys do not match, then the operation exits at step 512 and conventional processing takes place. In another embodiment, if the keys do not match then the next entry is analyzed, or if there are no more entries in the BTB then the operation exits at step 512 and conventional processing takes place. If the keys do match, then the compile branch target address, at step 514, is stored in register rF. The instruction then branches to this address at step 516.

Figure 6:
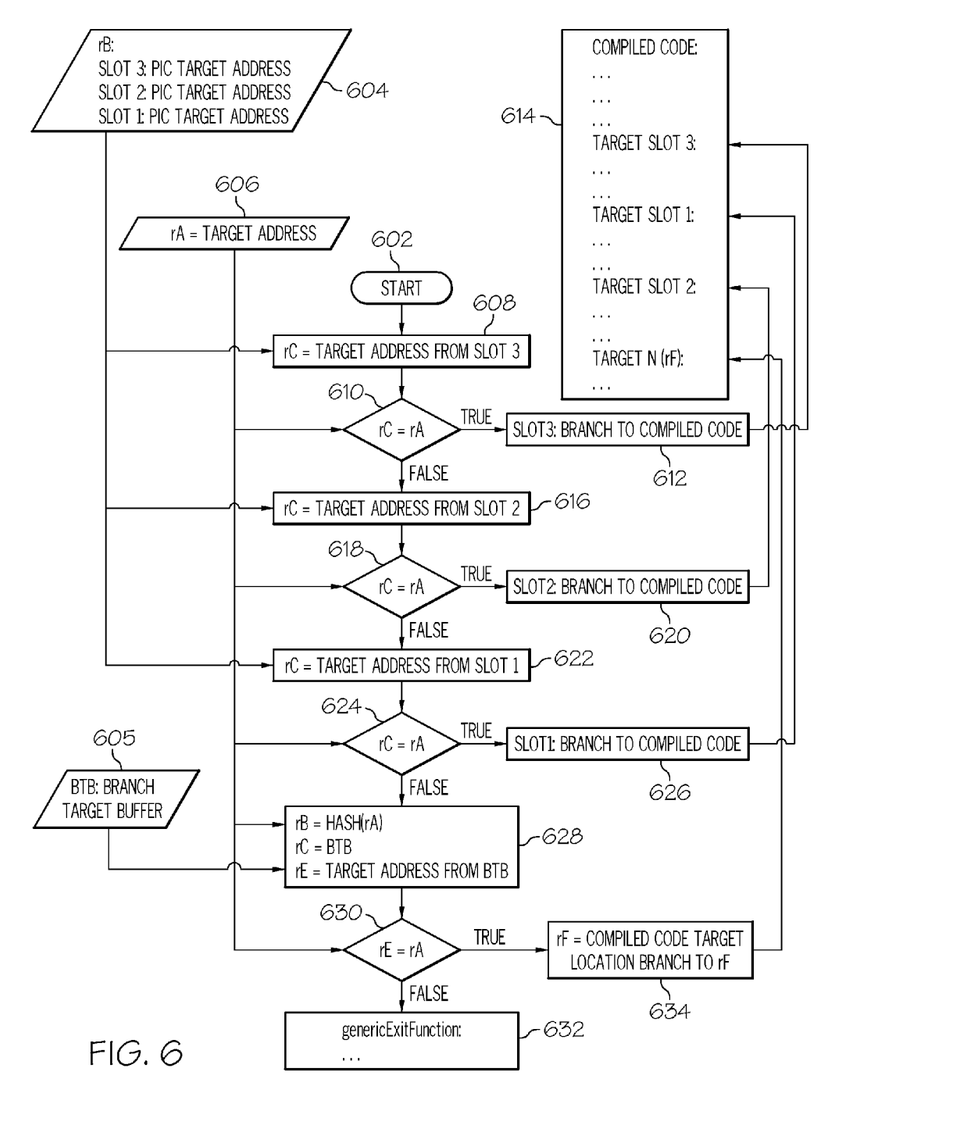
FIG. 6 is an operational flow diagram illustrating a process for managing indirect branch instructions using a hybrid Polymorphic Inline Cache-Branch Target Buffer search process according to one embodiment of the present invention.

FIG. 6 is an operational flow diagram illustrating a process for managing indirect branches using a hybrid PIC/BTB method within an emulator according to one embodiment of the present invention. The operational flow diagram begins at step 602. It should be noted that the PIC target addresses that have been stored/populated into register rB at step 604 are used as inputs in steps 608, 616, and 622. Register rB points to the beginning of a memory area that comprises a given number of slots each (three in this example) with a PIC target address. The BTB information 605 is used as an input in step 628. The target address stored/populated into register rA at step 606 is used for comparison in steps 610, 618, 624, and 630, and as an input in step 628. Register rC at steps 608, 616, and 622 is populated with the stored target address from the particular slot being analyzed.

The indirect branch identifier determines that an indirect branch has been encountered. The searching module, at step 608, analyzes a first slot in the PIC. The searching module, at step 610, determines if the target address of the first slot matches the target address of the indirect branch. If the result of this determination is positive, the instruction, at step 612, branches to the compiled code at the target address and continues operating at step 614. If the result of this determination is negative, the searching module, at step 616, analyzes the second slot in the PIC. The searching module, at step 618, determines if the target address of the second slot matches the target address of the indirect branch. If the result of this determination is positive, the instruction, at step 620, branches to the compiled code at the target address and continues operating at step 614. If the result of this determination is negative, the searching module, at step 622, analyzes the third slot in the PIC.

The searching module, at step 624, determines if the target address of the third slot matches the target address of the indirect branch. If the result of this determination is positive, the instruction, at step 626, branches to the compiled code at the target address and continues operating at step 614. If the result of this determination is negative, the searching module, at step 628, performs a search on the BTB residing within the emulator.

In particular, the searching module performs a hash on a key associated with the target address of the indirect branch instruction. In other words, the searching module performs a hash on the value in register rA and stores this value in register rB. The searching module then loads the address of the BTB from the emulated environment structure and stores this value in register rC. The key address is calculated from the values in registers rB and rC. The key address is then stored in register rD (See FIG. 4). The key is then loaded from the BTB and stored in register rE. The searching module, at step 630, compares the target address in register rA with the key from the BTB in register rE. If the keys do not match, then the operation exits at step 632 and conventional processing takes place. In another embodiment, if the keys do not match then the next entry is analyzed, or if there are no more entries in the BTB then the operation exits at step 632 and conventional processing takes place. If the keys do match, then the compile branch target address, at step 634, is stored in register rF. The instruction then branches to this address at step 614.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, one embodiment of the present invention may not include all of the features described above. Therefore, it is intended that the present invention not be limited to the particular embodiments disclosed, but that the invention include all embodiments falling within the scope of the appended claims.

What is claimed is:

1. A computer program product for managing branch instructions in an emulation environment that is executing a program, the computer program product comprising:
a non-transitory storage medium readable by a processing circuit and storing instructions for execution by the processing circuit for performing a method comprising:
populating a plurality of slots in a Polymorphic Inline Cache, each of the slots comprising a target address of a branch instruction of the program and a memory address of a compiled instruction representing the branch instruction;
populating a plurality of entries in a branch target buffer residing within an emulated environment in which the program is executing, each of entries comprising an instruction address and a target address of a branch instruction of the program; and
based on an indirect branch instruction associated with the program being encountered:
identifying, from the indirect branch instruction, a target address associated with the indirect branch instruction;
comparing, by a processor, at least one address in each of the slots of the Polymorphic Inline Cache to the target address associated with the indirect branch instruction; and
based on none of the addresses in the slots of the Polymorphic Inline Cache matching the target address associated with the indirect branch instruction, searching in the branch target buffer to identify one of the entries in the branch target buffer that is associated with the target address of the indirect branch instruction.

2. The computer program product of claim 1, wherein the searching comprises:
analyzing, by the processor, one of the entries in the branch target buffer to determine if the instruction address of the one entry is associated with the target address of the indirect branch instruction; and
based on the instruction address of the one entry being associated with the address of the indirect branch instruction, branching to the target address of the one entry.

3. The computer program product of claim 2, wherein the analyzing comprises using a hash function on a target address of the indirect branch instruction to obtain an indirect branch instruction target key.

4. The computer program product of claim 3, wherein the analyzing further comprises comparing the instruction address of the one entry to the indirect branch instruction target key.

5. The computer program product of claim 4, wherein the analyzing further comprises:
based on the instruction address of the one entry matching the indirect branch instruction target key, determining that the one entry is associated with the target address of the indirect branch instruction.

6. The computer program product of claim 1, wherein the emulated environment comprises a plurality of branch target buffers.

7. The computer program product of claim 1, wherein each of the entries also comprises a compiled branch target address that is a memory address associated with a compiled sequence of code.

8. An information processing system for managing branch instructions in an emulation environment that is executing a program, the information processing system comprising:
a processor;
a memory communicatively coupled to the processor; and
a hardware emulated environment communicatively coupled to the processor and the memory,
wherein the processor is configured to perform a method comprising:
populating a plurality of slots in a Polymorphic Inline Cache, each of the slots comprising a target address of a branch instruction of the program and a memory address of a compiled instruction representing the branch instruction;
populating a plurality of entries in a branch target buffer residing within an emulated environment in which the program is executing, each of entries comprising an instruction address and a target address of a branch instruction of the program; and
based on an indirect branch instruction associated with the program being encountered:
identifying, from the indirect branch instruction, a target address associated with the indirect branch instruction;
comparing, by a processor, at least one address in each of the slots of the Polymorphic Inline Cache to the target address associated with the indirect branch instruction; and
based on none of the addresses in the slots of the Polymorphic Inline Cache matching the target address associated with the indirect branch instruction, searching in the branch target buffer to identify one of the entries in the branch target buffer that is associated with the target address of the indirect branch instruction.

9. The information processing system of claim 8, wherein the searching comprises:
analyzing, by the processor, one of the entries in the branch target buffer to determine if the instruction address of the one entry is associated with the target address of the indirect branch instruction; and
based on the instruction address of the one entry being associated with the address of the indirect branch instruction, branching to the target address of the one entry.

10. The information processing system of claim 9, wherein the analyzing comprises using a hash function on a target address of the indirect branch instruction to obtain an indirect branch instruction target key.

11. The information processing system of claim 10, wherein the analyzing further comprises comparing the instruction address of the one entry to the indirect branch instruction target key.

12. The information processing system of claim 11, wherein the analyzing further comprises:
based on the instruction address of the one entry matching the indirect branch instruction target key, determining that the one entry is associated with the target address of the indirect branch instruction.

13. The information processing system of claim 8, wherein the emulated environment comprises a plurality of branch target buffers.

14. The information processing system of claim 8, wherein each of the entries also comprises a compiled branch target address that is a memory address associated with a compiled sequence of code.

* * * * *